United States Patent [19]
Meier et al.

[11] Patent Number: 6,136,876
[45] Date of Patent: Oct. 24, 2000

[54] WEAK BRONSTED ACID DERIVATIVES FOR IMPROVING DIMENSIONAL STABILITY OF POLYURETHANE FLEXIBLE FOAMS

[75] Inventors: Ingrid Kristine Meier, Asbury, N.J.; Michael Louie, Bethlehem, Pa.

[73] Assignee: Air Products and Chemicals, Allentown, Pa.

[21] Appl. No.: 09/193,995

[22] Filed: Nov. 17, 1998

[51] Int. Cl.[7] .......................................... C08J 9/04
[52] U.S. Cl. ......................... 521/112; 521/113; 521/130; 521/131; 521/155; 521/158; 521/170; 521/172; 521/174
[58] Field of Search ...................... 521/112, 113, 521/130, 131, 155, 158, 170, 172, 174

[56] References Cited

U.S. PATENT DOCUMENTS

| | | |
|---|---|---|
| 3,314,834 | 4/1967 | Walden et al. . |
| 3,635,906 | 1/1972 | Jayawant . |
| 3,972,846 | 8/1976 | Mori et al. . |
| 4,251,635 | 2/1981 | Stone . |
| 4,426,510 | 1/1984 | DelDonno . |
| 4,721,642 | 1/1988 | Yoshimi et al. . |
| 5,114,985 | 5/1992 | Kuyzin et al. ............................ 521/130 |
| 5,852,065 | 12/1998 | Frey et al. ............................... 521/112 |

FOREIGN PATENT DOCUMENTS

| | | |
|---|---|---|
| 2141890 | 2/1995 | Canada . |
| 1005722 | 4/1957 | Germany . |
| 2451726 | 5/1976 | Germany . |
| 2303372 | 2/1997 | United Kingdom . |

OTHER PUBLICATIONS

"The ICI Polyurethanes Book", Second Edition, John Wiley & Sons, (1990).
"Air Products Polyurethane Additives" wallchart (1998).

*Primary Examiner*—John M. Cooney, Jr.
*Attorney, Agent, or Firm*—Michael Leach

[57] ABSTRACT

A method for preparing a flexible polyurethane foam by reacting an organic polyisocyanate with a polyol in the presence of urethane catalyst, water as a blowing agent, optionally a silicone surfactant, and a cell opener characterized in that the cell opener comprises an active methylene- or methine-group containing compound.

17 Claims, No Drawings

WEAK BRONSTED ACID DERIVATIVES FOR IMPROVING DIMENSIONAL STABILITY OF POLYURETHANE FLEXIBLE FOAMS

FIELD OF THE INVENTION

The invention relates to making polyurethane flexible foams using dimensional stabilizer/cell openers.

BACKGROUND OF THE INVENTION

Flexible molded polyurethane foam requires mechanical crushing to open foam cells and prevent shrinkage and to improve dimensional stability of the foam pad. Current mechanical methods for cell opening consist mainly of crushing, vacuum rupture or time pressure release.

Upon demold, mechanically crushing and breaking the polyurethane foam cells enables the polyurethane foam to be more dimensionally stable. Another method of breaking the cells is vacuum crushing which involves drawing a vacuum on the finished polyurethane foam causing cell rupture. The overall effect of these methods is reduced foam shrinkage.

Other mechanical attempts have been made to achieve dimensionally stable foam, such as decreasing cycle production times. For example, demolding the polyurethane foam in three minutes as compared to four minutes will dramatically improve the dimensional stability. Another method for producing dimensionally stable foam is time pressure release (TPR). TPR comprises opening the mold during the curing process to release the internal pressure and then reclosing for the duration of the cure time. The sudden release of the internally generated pressure bursts the cell windows, thereby obtaining an open cell foam.

Mechanical methods usually result in incomplete or inconsistent cell opening and require a flexible molded foam producer to invest in additional machinery. A chemical method for cell opening would be preferred.

The current chemical methods all have drawbacks such as requiring high levels (often as high as 1–5 pphpp) or adversely affecting the foam physical properties.

U.S. Pat. No. 3,314,834 discloses that diketo compounds form effective potlife extension agents in polyurethane propellants.

U.S. Pat. No. 3,635,906 discloses certain chelate-forming compounds have the effect of delaying initiation of reaction between an organic polyisocyanate and an organic polyhydroxy compound in the presence of an amine-free organotin cure rate catalyst, thereby extending the pot life of the reaction medium without retarding the rate of cure.

U.S. Pat. No. 4,426,510 discloses coating or adhesive compositions having extended potlife and short cure time comprising an organic polyol, an organic polyisocyanate, an organozinc cure rate catalyst, and a compound selected from (a) beta-dicarbonyl compounds, (b) alpha-hydroxy ketones, (c) fused aromatic beta-hydroxy ketones, and (d) beta-hydroxy nitrogen-heterocyclic fused aromatics.

GB 2,303,372 discloses making polyurethane foams using the mechanical frothing technique and a catalyst system comprising a metal acetyl acetonate and acetyl acetone. It is suggested that the invention can benefit chemically frothed urethane foams and non-foamed polyurethane.

U.S. Pat. No. 4,721,642 discloses a blocked polyisocyanate prepolymer formed by blocking the terminal —NCO group of the polyisocyanate with a blocking agent such as, alcohol, phenols, ethyl acetoacetate, ε-caprolactam, MEK oxime, diethyl malonate, acetoacetone, cyanic acid, and sodium bisulfite. A polyurethane resin foamable paint comprises an aqueous dispersion composed of blocked polyisocyanate prepolymer, additives, chain extender, foaming agent and emulsifier.

CA 2,141,890 discloses the production of rigid polyurethane, polyisocyanurate and polyurethane urea foams with HCFC blowing agents and optionally a flame retardant and/or chelating agent which is acidic, i.e., having a pKa value from 0 to 10.

U.S. Pat. No. 3,972,846 discloses a curable polyurethane composition comprising a keto compound and a liquid mixture of an organic aliphatic polyfunctional polyisocyanate and a compound having active hydrogen. The curable polyurethane composition is characterized by exhibiting a long pot life due to the presence of the keto compound.

U.S. Pat. No. 4,251,635 discloses flexible polyurethane foam having reduced tendency to form burning embers when it is ignited and burned by incorporating a ketone or benzaldehyde into the reaction mixture before foaming.

DE 1 005 722 discloses reactions of polyols with polyisocyanates can be retarded by adding an imine (the condensation product of a primary amine and an aldehyde, ketone or diketone).

DE 2 451 726 discloses a process for slowing down the reaction of isocyanate compounds with polyester polyols in which the polyols contain at least one aldehyde and/or ketone and a mono-amine in the molar ratio of aldehyde or ketone group: amino group from 1:0.1 to 1.

SUMMARY OF THE INVENTION

The invention provides a method for preparing flexible polyurethane foams using certain cell opening additives. The method comprises reacting an organic polyisocyanate and a polyol in the presence of a catalyst composition, a blowing agent, optionally a silicone surfactant cell stabilizer, and as a dimensionally stabilizing, cell opening agent an active methylene- or methine-group containing compound.

The use of these active methylene- or methine-group containing compounds in making flexible polyurethane foam provides the following advantages:

the polyurethane foams (flexible molded and flexible slabstock) manifest reduced shrinkage which provides for improved dimensional stability a reduction in the force necessary to crush freshly demolded flexible foam without adversely affecting the physical properties of the foam relatively low levels of the additive, e.g., 0.001–2.5 parts by weight per hundred parts of polyol (pphpp) are necessary to create cell opening the polyurethane cellular structure exhibits a more uniform and consistent gradient within the medium or "bulk" of the polyurethane part cellular structure is not degraded and is visually more evenly distributed at or near the pour surface and throughout the polyurethane article For purposes of this invention and as is understood by many in the art, flexible molded foams can include microcellular foams such as those used in shoe soles and steering wheels as well as the flexible molded foams used in furniture, bedding and automotive seating.

DETAILED DESCRIPTION OF THE INVENTION

The stabilizer/cell opener additives used in the preparation of the flexible foams are weak Bronsted acids, specifically any compound that contains an active methylene or methine group. Active methylene and methine compounds are carbon acids containing electron-withdrawing groups. The electron-withdrawing groups act to increase the acidity of neighboring carbon-hydrogen bonds by stabilizing the conjugate base that is formed upon deprotonation (T. H. Lowry and K. S. Richardson, *Mechanism and Theoly in Organic Chemistry*, 2nd Ed., 1981, pp. 262–281). Typical electron-withdrawing groups are —$NO_2$, —CN, —F, —Cl, —Br, —$CF_3$, —I, —C(O)OR, —C(O)R, —CHO, —C(O)$NH_2$, $RSO_2$—, where R is any alkyl or aryl group. Conversely, the presence of an electron-donating group, such as an alkyl group, can decrease the acidity of neighboring carbon-hydrogen bonds.

Relative acidities of these types of compounds can be determined by a number of methods. One common method is to measure the equilibrium constant for dissociation, Ka, of the compounds. Tables of pKa values for a variety of Bronsted acids are readily available (for example in J. A. Dean, *Lange's Handbook of Chemistry*, 14th Ed., 1992, pp. 8.19–8.71). However, solvent plays a large part in determining acidities in solution; therefore, one must be careful to compare pKa values that have been obtained using dilute solutions of the compounds in the same solvent at the same temperature. Alternatively, gas-phase acidities (AHI) of the compounds can be measured or calculated in order to obtain relative acidities of these types of compounds.

Because of the strong role that solvent plays in determining the acidities of compounds in solution, certain active methylene and methine compounds will perform better as cell openers if they are dissolved in water than if they are delivered as a neat liquid or as solutions in less polar solvents. Many of the compounds that are effective for improving the dimensional stability (reducing shrinkage) of polyurethane foam have pKa values that are less than about 10.8 (measured in water at 25° C.). However, the pKa values of active methylene and methine compounds that are less water soluble (for example, substituted β-diketones) may be misleading. Because of this, the compounds of this invention are not limited by having a pKa value within a specified range.

Examples of suitable compounds are β-dicarbonyl compounds, esters of cyanoacetic acid, esters of 1,3-acetone dicarboxylic acid, 2-acyl-1,3-diketones, 2-acyl-1,3-keto esters, and esters of substituted-acetic acids in which the substituents are electron-withdrawing groups. Derivatives of the compounds described above, including amides that result from the reaction of a β-diketone with an alkyl or aryl isocyanate, or enol tautomers of any of the above-mentioned compounds are also members of this class of cell openers.

One preferred class of p-dicarbonyl compounds comprises β-diketones of the formula

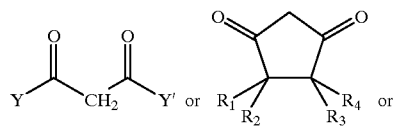

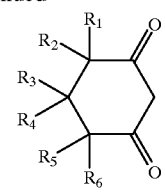

in which $R_1$, $R_2$, $R_3$, $R_4$, $R_5$, and $R_6$ are independently hydrogen, C1–C20 alkyl, C6–C10 aryl, substituted- C1–C20 alkyl or substituted- C6–C10 aryl groups; Y and Y' are independently C6–C10 aryl, substituted- C6–C10 aryl, or CXX'X" wherein X, X', and X" are independently hydrogen, halogen, C1–C20 alkyl, C6–C10 aryl, substituted- C1–C20 alkyl, or substituted- C6–C10 aryl groups. Typical β-diketones of this structure include: 2,4-pentanedione, 2,4-hexanedione, 2,4-heptanedione, 2,4-octanedione, 2,4-decanedione, 2,4-tridecanedione, 1,1,1 -trifluoro-2,4-pentanedione, 1,1,1,5,5,5-hexafluoro-2,4-pentanedione, 5-methyl-2,4-hexanedione, 5,5-dimethyl-2,4-hexanedione, 2,2-dimethyl-3,5-nonanedione, 2,2,6,6-tetramethyl-3,5-heptanedione, 1,3-cyclopentanedione, 1,3-cyclohexanedione, 1-cyclohexyl-1,3-butanedione, 5,5-dimethyl-1,3-cyclohexanedione (dimedone), 1-phenyl-1,3-butanedione (1-benzoylacetone), 1-phenyl-1,3-pentanedione, 1,3-diphenyl-1,3-propanedione (dibenzoylmethane), 1-phenyl-5,5-dimethyl-2,4-hexanedione, 1-(4-biphenyl)-1,3-butanedione, 1-phenyl-3-(2-methoxyphenyl)-1,3-propanedione, 1-(4-nitrophenyl)-1,3-butanedione, 1-(2-furyl)-1,3-butanedione, and 1-(tetrahydro-2-furyl)-1,3-butanedione.

Another preferred class of β-dicarbonyl compounds comprises β-keto esters of the formula

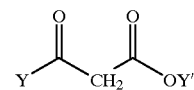

in which Y and Y' are independently C6–C10 aryl or CXX'X" wherein X, X', and X" are independently hydrogen, halogen, C1–C20 alkyl, C6–C10 aryl, substituted- C1–C20 alkyl, or substituted- C6–C10 aryl groups. Typical examples of these esters are methyl acetoacetate, ethyl acetoacetate, propyl acetoacetate, tert-butyl acetoacetate, n-butyl acetoacetate, octyl acetoacetate, and decyl acetoacetate.

It is preferred to use β-dicarbonyl compounds such as, for example, β-diketones and β-diketoesters in flexible foam formulations that are amine-catalyzed (free of metal based catalysts such as tin compounds) and water-blown (no HCFCs).

Other β-dicarbonyl compounds which are suitable include 2,2-dimethyl-1,3-dioxane-4,6-dione (Meldrum's acid), thenoyltrifluoroacetone, and dehydroacetic acid.

Esters of cyanoacetic acid have the general formula

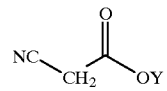

in which Y is C6–C10 aryl or CXX'X" wherein X, X', and X" are independently hydrogen, halogen, C1–C20 alkyl, C6–C10 aryl, substituted- C1–C20 alkyl, or substituted- C6–C10 aryl groups. Typical examples of these cyanoacetic acid esters include: methyl cyanoacetate, ethyl cyanoacetate, n-propyl cyanoacetate, iso-propyl cyanoacetate, n-butyl cyanoacetate, tert-butyl cyanoacetate, octyl cyanoacetate, n-decyl cyanoacetate, and methoxyethyl cyanoacetate.

Esters of 1,3-acetone dicarboxylic acid have the general formula

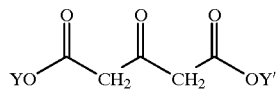

in which Y and Y' are independently C6–C10 aryl or CXX'X" wherein X, X', and X" are independently hydrogen, halogen, C1–C20 alkyl, C6–C10 aryl, substituted- C1–C20 alkyl, or substituted- C6–C10 aryl groups. Typical examples of esters of 1,3-acetone dicarboxylic acid are dimethyl 1,3-acetonedicarboxylate, diethyl 1,3-acetonedicarboxylate, and di-tert-butyl 1,3-acetonedicarboxylate.

Compounds that are 2-acyl-1,3-diketones have the general formula

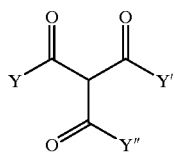

in which Y, Y', and Y" are independently C6–C10 aryl or CXX'X" wherein X, X', and X" are independently hydrogen, halogen, C1–C20 alkyl, C6–C10 aryl, substituted- C1–C20 alkyl, or substituted- C6–C10 aryl groups. An example of a 2-acyl-1,3-diketone is triacetylmethane.

Esters of substituted-acetic acids in which the substituents are electron-withdrawing groups have the general formula

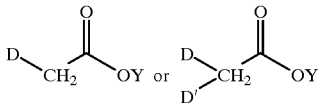

in which Y is C6–C10 aryl or CXX'X" wherein X, X', and X" are independently hydrogen, halogen, C1–C20 alkyl, C6–C10 aryl, substituted- C1–C20 alkyl, or substituted- C6–C10 aryl groups, and D and D' are electron-withdrawing substituents such as $NO_2$, CN, F, Cl, Br, $CF_3$, I, C(O)OR, C(O)R, CHO, C(O)$NH_2$, and the like. Typical examples of such compounds include ethyl chloroacetic acid, ethyl fluoroacetic acid, and ethyl nitroacetic acid.

In the above formulae the C1–C20 alkyl groups may be linear or branched and include methyl, ethyl, n-propyl, iso-propyl, n-butyl, sec-butyl, tert-butyl, pentyl, hexyl, octyl, 2-ethylhexyl, n-decyl, dodecyl, cetyl and stearyl, especially the C1–C10 alkyl groups. They may be substituted with aryl, halide, hydroxy, amino, alkoxy, phenoxy, nitro, keto, cyano, alkylamino, thiol, carboxylate and the like substituents.

In the above formulae the C6–C10 aryl groups may be phenyl or naphthyl and substituted with alkyl, aryl, halide, hydroxy, amino, alkoxy, phenoxy, nitro, keto, cyano, alkylamino, thiol, carboxylate and the like.

The preferred use level of these cell openers is between 0.001–2.5 pphpp, more preferred is between 0.005–1.5 pphpp, and most preferred is between 0.01–0.5 pphpp. The cell opener can be delivered as a neat liquid or dissolved in one of the components of the formulation such as the surfactant, water, amine catalyst, crosslinker or polyol.

The stabilizer/cell openers according to the invention are employed in the manufacture of polyether and polyester flexible polyurethane foams in the manner known to the art. In producing the polyurethane foams using these cell openers, one or more polyether or polyester polyols are employed for reaction with a polyisocyanate, especially a diisocyanate, to provide the urethane linkage. Such polyols have an average of typically 2.0 to 3.5 hydroxyl groups per molecule, hydroxyl numbers (OH#) from 20 to 60, and weight average molecular weights from 2000 to 7000 daltons (atomic mass units). The density of a flexible polyurethane foam can be 0.6–25 lb/ft$^3$ (10–400 kg/m$^3$).

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in flexible polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

The polyurethane products are prepared using any suitable organic polyisocyanate well known in the art including, for example, hexamethylene diisocyanate, phenylene diisocyanate, toluene diisocyanate (TDI) and 4,4'-diphenylmethane diisocyanate (MDI). Especially suitable are the 2,4- and 2,6-TDI's individually or together as their commercially available mixtures. Other suitable isocyanates are mixtures of diisocyanates known commercially as "crude MDI", also known as PAPI, which contain about 60% of MDI along with other isomeric and analogous higher polyisocyanates. Also suitable are "prepolymers" of these polyisocyanates comprising a partially prereacted mixture of a polyisocyanate and a polyether or polyester polyol.

Suitable urethane catalysts useful in making polyurethane flexible foams are all those well known to the worker skilled in the art and include tertiary amines like those used to catalyze the acid anhydride/alcohol reaction, such as triethylenediamine, N-methylimidazole, 1,2-dimethylimidazole, N-methyl morpholine, N-ethyl morpholine, triethylamine, tributylamine, triethanolamine, dimethylethanolamine and bis(dimethylaminoethyl) ether, and organotins such as stannous octoate, stannous acetate, stannous oleate, stannous laurate, dibutyltin dilaurate, and other such tin salts.

Other typical agents found in the flexible polyurethane foam formulations include chain extenders such as ethylene glycol and butanediol; crosslinkers such as diethanolamine, diisopropanolamine, triethanolamine and tripropanolamine; blowing agents such as water, liquid carbon dioxide, CFCs, HCFCs, HFCs, pentane, and the like, especially water or water and HCFC; and cell stabilizers such as silicones.

The flexible polyurethane foams that can be prepared using the present invention include slabstock foams having a density of 12–100 kg/m$^3$, such as polyether-based: conventional (12–60 kg/m$^3$), high resilience (18–80 kg/m$^3$), filled (40–100 kg/m$^3$), semi-rigid (22–35 kg/m$^3$); and polyester-based: technical grades (20–50 kg/m$^3$), laminating grades (20–35 kg/m$^3$) and semi-rigid (22–35 kg/m$^3$) as well as molded foams having a density of 22–300 kg/m$^3$, such as polyether-based: conventional hot-cure (22–50 kg/m$^3$), high resilience and cold-cure (28–55 kg/m$^3$), semi-rigid (40–150 kg/m$^3$), and polyester-based (50–150 kg/m$^3$), "repol" or rebonded (60–300 kg/m$^3$). Also possible are microcellular molded foams having a core density of 400–600 kg/m$^3$, a skin density of 600–800 kg/m$^3$ and an overall density of 500–700 kg/m$^3$.

A general polyurethane flexible molded foam formulation having a 0.6–25 lb/ft$^3$ (10–400 kg/m$^3$) density, e.g., automotive seating 1–3 lb/ft$^3$ (16–48 kg/m$^3$), containing a stabilizer/cell opener according to the invention would comprise the following components in parts by weight (pbw):

| Flexible Foam Formulation | pbw |
| --- | --- |
| Polyol | 20–100 |
| Polymer Polyol | 80–0 |
| Silicone Surfactant | 0.5–2.5 |
| Stabilizer/Cell Opener | 0.05–3 |
| Water | 1–8 |
| Auxiliary Blowing Agent | 0–4.5 |
| Crosslinker | 0.5–2 |
| Catalyst Composition | 0.1–5 |
| Isocyanate Index | 70–115 |

In the present invention the preferred blowing agent for making the flexible molded foams is water at 1 to 8 parts per hundred polyol (pphp), especially 3 to 6 pphp, optionally with other blowing agents.

Other additives may of course be employed to impart specific properties to the flexible foams. Examples are materials such as flame retardants, colorants, fillers and hardness modifiers.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation. It is sometimes convenient to add the stabilizer/cell opener to the reaction mixture as a premixture with one or more of the blowing agent, polyol, water, and catalyst components.

EXAMPLE 1

TDI flexible molded polyurethane foams were prepared using the formulation in Table I.

Table I

| Component | Parts by Weight |
| --- | --- |
| Arcol E-648 Polyether Polyol[1] | 60.0 |
| Arcol E-519 Styrene-Acrylonitrile Polyol[1] | 40.0 |
| DABCO ® DEOA-LF (75% diethanolamine in water)[2] | 1.75 |
| DABCO ® DC-5169 Silicone Surfactant[2] | 0.60 |
| DABCO ® DC-5164 Silicone Surfactant[2] | 0.20 |
| Water (total) | 3.50 |
| DABCO ® 33 LV Amine Catalyst[2] | 0.25 |
| DABCO ® BL-11 Amine Catalyst[2] | 0.10 |
| Cell Opener | Variable |
| Mondur TD-80[3], TDI Index = 105 | |

[1]Arco Chemical
[2]Air Products and Chemicals, Inc.
[3]Bayer Corp.

Molded polyurethane foam samples were prepared using the following procedure. Resin premix is prepared by combining the polyols, DEOA-LF, surfactants, water, catalysts, and (optionally) cell opener. This liquid is then mixed for 3–5 minutes using a Premier Mill mixer set between 2000–6000 rpm. The resin premix is stored in an incubator at 22° C. until needed. The desired amount of premix is weighed into a tared 32 oz (946 ml) cup. Then the corresponding amount of TDI is added to this "B-side" blend and the resulting liquid mixed for 5 seconds at 5000 rpm using a Servodyne® lab mixer. The mixture is poured into a 12"×12"×3" (30.5 cm×30.5 cm×7.6 cm) mold which has been pre-heated to 155–165° F. (68–74° C.) and sprayed with a solvent-based release agent (PRC-798); the cup is held in an inverted position for 5 seconds, and the mold is immediately closed. The formulation is permitted to react in the mold for 5 minutes, after which the part is immediately demolded and weighed.

The foams in Table II were not crushed after demold, but were allowed to sit on end until they had cooled, at which point the degree of shrinkage relative to the control foam was determined. The foams in Table III were placed on a force-to-crush (FTC) apparatus immediately after demold; the first compression cycle was 60 seconds after demold. The force detection device is equipped with a 1000 pound (454 kg) capacity pressure transducer mounted between the 50 square inch (322 cm$^2$) circular plate and the drive shaft. The actual pressure is shown on a digital display. The pad is compressed to 50 percent of its original thickness and the force necessary to achieve the highest compression/cycle is recorded in whole pounds. Several compression cycles are completed. A cycle takes approximately 30 seconds to complete. This device mimics the ASTM D-3574, Indentation Force Deflection Test, and provides a numerical value of freshly demolded foams initial hardness or softness. Values are reported as the FTC value for the foam, based on the assumption that the lower the FTC values are the more open the foam is. Hence, the dimensional stability should be improved. This test requires the foam to be acceptably cured at demold.

It can be seen in general that the active methylene- or methine-group containing compounds afforded a foam with less shrinkage than the control foam. In some instances the compound needed to be delivered in water to obtain the effect. See Runs 14/15 and 16/17. Runs 18 and 22 used compound which did not contain an active methylene or methine group. The 3-methyl-2,4-pentanedione compound of Run 19 when delivered in water as Run 33 in Table III showed a lower initial force-to-crush indicating a more open cell structure. Its homolog 3-ethyl-2,4-pentanedione (Run 20) would, it is believed, behave similarly, as would diethyl malonate (Run 21).

TABLE II

| Run | Cell Opener | Use Level active (pphp) | Less Shrinkage Than Control? |
|---|---|---|---|
| 1 | none | 0 | control foam |
| 2 | 2,4-pentanedione | 0.10 | yes |
| 3 | 2,4-hexanedione | 0.11 | yes |
| 4 | dibenzoylmethane, 17.26% in DC-5169 | 0.13 | yes |
| 5 | 1-benzoylacetone, 13.18% in DC-5169 | 0.09 | yes |
| 6 | triacetylmethane | 0.08 | yes |
| 7 | methyl cyanoacetate | 0.03 | yes |
| 8 | ethyl cyanoacetate | 0.04 | yes |
| 9 | butyl cyanoacetate | 0.05 | yes |
| 10 | octyl cyanoacetate | 0.07 | yes |
| 11 | diethyl 1,3-acetone dicarboxylate | 0.20 | yes |
| 12 | pyrrolidine derivative of 2,4-pentanedione | 1.13 | yes |
| 13 | piperidine derivative of 2,4-pentanedione | 0.25 | yes |
| 14 | 1,3-cyclohexanedione, 25% in di(propylene glycol) | 0.11 | no |
| 15 | 1,3-cyclohexanedione, 3.125% in water | 0.10 | yes |
| 16 | ethyl acetoacetate | 0.13 | no |
| 17 | ethyl acetoacetate, 3.78% in water | 0.13 | yes |
| 18 | 3,3-dimethyl-2,4-pentanedione | 0.13 | no |
| 19 | 3-methyl-2,4-pentanedione | 0.11 | no |
| 20 | 3-ethyl-2,4-pentanedione | 0.13 | no |
| 21 | diethylmalonate | 0.16 | no |
| 22 | 2,5-hexanedione | 0.11 | no |

TABLE III

| | Cell Opener | | Initial Force-to- |
|---|---|---|---|
| Run | Compound | pphp | Crush Value |
| 23 | none | 0 | 99 |
| 24 | 2,4-pentanedione | 0.056 | 40 |
| 25 | 1-benzoylacetone | 0.09 | 32 |
| 26 | none | 0 | 69 |
| 27 | dibenzoylmethane | 0.125 | 36 |
| 28 | triacetylmethane | 0.12 | 18 |
| 29 | none | 0 | 34 |
| 30 | ethyl cyanoacetate | 0.04 | 10 |
| 31 | butyl cyanoacetate | 0.05 | 10 |
| 32 | octyl cyanoacetate | 0.07 | 10 |
| 33a | 3-methyl-2,4-pentanedione in water | 0.25 | 25 |
| 33b | 3-methyl-2,4-pentanedione in water | 0.25 | 19 |
| 33c | 3-methyl-2,4-pentanedione in DABCO 33LV | 0.25 | 24 |
| 34 | none | 0 | 31 |
| 35a | ethyl nitroacetate | 0.015 | 13 |
| 35b | ethyl nitroacetate | 0.025 | 10 |

EXAMPLE 2

MDI flexible molded polyurethane foams were prepared in these examples using the formulation in Table IV.

TABLE IV

| Component | Parts by Weight |
|---|---|
| Voranol CP 6001 Polyol[1] | 100.0 |
| XF-I2585 Silicone Surfactant[2] | 0.40 |
| DABCO ® DEOA-LF (75% diethanolamine in water)[2] | 0.71 |
| Water (total) | 2.99 |
| DABCO ® 33 LV Amine Catalyst[2] | 0.25 |
| DABCO ® BL-11 Amine Catalyst[2] | 0.25 |
| Cell Opener | Variable |
| Desmodur 3230[3], MDI Index = 100 | |

[1]Dow Chemical
[2]Air Products and Chemicals, Inc.
[3]Bayer Corp.

Molded polyurethane foam samples were prepared using the following procedure. The amine pre-blend is prepared by mixing the water, DEOA-LF and amine catalysts on the same day that the foams are to be made. The polyol is measured into a ½ gallon (1.89 L) cup and the silicone surfactant is added. Using a Servodyne® dispersator with a 3" (7.6 cm) disc mixing blade and controller set to 6000 rpm (loaded), the cup of liquid is mixed for 25 seconds. The amine pre-blend and (optionally) cell opener is added, and the mixture is mixed for 20 seconds. The MDI is added, and the liquid is mixed for 6 seconds. The mixture is poured into a 12"×12"×4" (30.5 cm×30.5 cm×10.2 cm) mold which has been pre-heated to 126° F. (52° C.) and sprayed with a solvent-based release agent (PRC-798); the cup is held in an inverted position for 5 seconds, and the mold is immediately closed. The formulation is permitted to react in the mold for 355 seconds, after which the part is immediately demolded. The first force-to-crush (FTC) measurement is taken 55 seconds after demold. To measure percent shrinkage, a separate pad is prepared in a similar manner to the first. However, after

TABLE IV

| Component | Parts by Weight |
|---|---|
| Voranol CP 6001 Polyol[1] | 100.0 |
| XF-I2585 Silicone Surfactant[2] | 0.40 |
| DABCO ® DEOA-LF (75% diethanolamine in water)[2] | 0.71 |
| Water (total) | 2.99 |
| DABCO ® 33 LV Amine Catalyst[2] | 0.25 |
| DABCO ® BL-11 Amine Catalyst[2] | 0.25 |
| Cell Opener | Variable |
| Desmodur 3230[3], MDI Index = 100 | |

[1]Dow Chemical
[2]Air Products and Chemicals, Inc.
[3]Bayer Corp.

Molded polyurethane foam samples were prepared using the following procedure. The amine pre-blend is prepared by mixing the water, DEOA-LF and amine catalysts on the same day that the foams are to be made. The polyol is measured into a ½ gallon (1.89 L) cup and the silicone surfactant is added. Using a Servodyne® dispersator with a 3" (7.6 cm) disc mixing blade and controller set to 6000 rpm (loaded), the cup of liquid is mixed for 25 seconds. The amine pre-blend and (optionally) cell opener is added, and the mixture is mixed for 20 seconds. The MDI is added, and the liquid is mixed for 6 seconds. The mixture is poured into a 12"×12"×4" (30.5 cm×30.5 cm×10.2 cm) mold which has been pre-heated to 126° F. (52° C.) and sprayed with a solvent-based release agent (PRC-798); the cup is held in an inverted position for 5 seconds, and the mold is immediately closed. The formulation is permitted to react in the mold for 355 seconds, after which the part is immediately demolded. The first force-to-crush (FTC) measurement is taken 55 seconds after demold. To measure percent shrinkage, a separate pad is prepared in a similar manner to the first. However, after demold it is allowed to sit on end to cool. After 24 hours, the percent shrinkage is measured.

TABLE V

| Run | Cell Opener | Parts by Weight | Initial Force-to-Crush | Percent Shrinkage |
|---|---|---|---|---|
| 36 | None | 0 | 224 | 17% |
| 37 | 2,4-Pentanedione | 0.50 | 215 | 19% |
| 38 | 2,4-Pentanedione | 2.0 | 180 | 13% |
| 39 | None | 0 | 235 | 25% |
| 40 | Ethyl Cyanoacetate | 0.02 | 221 | 22% |
| 41 | Ethyl Cyanoacetate | 0.25 | 86 | 6% |
| 42 | None | 0 | 229 | 25% |
| 43 | Ethyl Cyanoacetate | 0.15 | 157 | 11% |

EXAMPLE 3

MDI flexible molded polyurethane foams were prepared in this example using the formulation in Table VI.

TABLE VI

| Component | Parts by Weight |
|---|---|
| Polyether Polyol | 100.0 |
| 70% 35 OH | |
| 30% Polymer Polyol 25.4 OH | |
| Silicone Surfactant | 0.50 |
| DABCO ® DEOA-LF (75% diethanolamine in water)[1] | 1.50 |
| Water (total) | 4.00 |
| DABCO ® 33 LV Amine Catalyst[1] | 0.25 |
| DABCO ® BL-11 Amine Catalyst[1] | 0.12 |
| DABCO ® BL-161 | 0.15 |
| Cell Opener | Variable |
| Polymeric MDI Isocyanate, NCO Range 25–26 | NCO Index = 100 |

[1]Air Products and Chemicals, Inc.

Foams were prepared as in Example 2. All foams had the same pad weight.

TABLE VII

| Run | Cell Opener | Parts by Weight | Initial Force-to-Crush | Comment |
|---|---|---|---|---|
| 44 | None | 0 | 54 | — |
| 45 | Ethyl Cyanoacetate | 0.10 | 40 | — |
| 46 | Ethyl Cyanoacetate | 0.25 | 27 | took a hand set |
| 47 | None | 0 | 54 | — |
| 48 | Octyl Cyanoacetate | 0.10 | 48 | — |
| 49 | Octyl Cyanoacetate | 0.25 | 38 | — |
| 50 | Octyl Cyanoacetate | 0.50 | 26 | took a hand set |

STATEMENT OF INDUSTRIAL APPLICATION

The invention affords a method for making water blown polyurethane flexible foams with improved cell opening.

We claim:

1. In a method for preparing a flexible polyurethane foam which comprises reacting an organic polyisocyanate with a polyol in the presence of a urethane catalyst, a blowing agent, optionally a silicone surfactant cell stabilizer, and a cell opener, the improvement for reducing shrinkage and/or the force-to-crush of the flexible foam which comprises as the cell opener an active methylene- or methine-group containing compound.

2. The method of claim 1 in which the cell opener comprises an active methylene- or methine-group containing compound selected from the group consisting of β-dicarbonyl compounds, esters of cyanoacetic acid, esters of 1,3-acetone dicarboxylic acid, 2-acyl-1,3-diketones, 2-acyl-1,3-keto esters, and esters of substituted-acetic acids in which the substituents are electron-withdrawing groups.

3. The method of claim 1 in which the cell opener comprises a β-diketone of one of the formulae

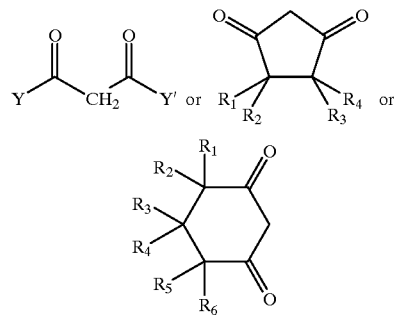

in which $R_1$, $R_2$, $R_3$, $R_4$, $R_5$, and $R_6$ are independently hydrogen, C1–C20 alkyl, C6–C10 aryl, substituted- C1–C20 alkyl or substituted- C6–C10 aryl groups; Y and Y' are independently C6–C10 aryl, substituted- C6–C10 aryl, or CXX'X" wherein X, X', and X" are independently hydrogen, halogen, C1–C20 alkyl, C6–C10 aryl, substituted- C1–C20 alkyl, or substituted- C6–C10 aryl groups.

4. The method of claim 1 in which the cell opener comprises a β-keto ester of the formula

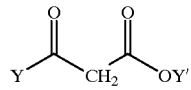

in which Y and Y' are independently C6–C10 aryl or CXX'X" wherein X, X', and X" are independently hydrogen, halogen, C1–C20 alkyl, C6–C10 aryl, substituted- C1–C20 alkyl, or substituted- C6–C10 aryl groups.

5. The method of claim 1 in which the cell stabilizer comprises an ester of cyanoacetic acid having the general formula

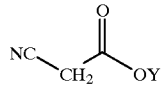

in which Y is C6–C10 aryl or CXX'X" wherein X, X', and X" are independently hydrogen, halogen, C1–C20 alkyl, C6–C10 aryl, substituted- C1–C20 alkyl, or substituted- C6–C10 aryl groups.

6. The method of claim 1 in which the cell stabilizer comprises an ester of 1,3-acetone dicarboxylic acid of the general formula

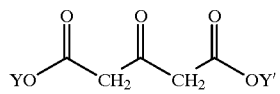

in which Y and Y' are independently C6–C10 aryl or CXX'X" wherein X, X', and X" are 5 independently hydrogen, halogen, C1–C20 alkyl, C6–C10 aryl, substituted- C1–C20 alkyl, or substituted- C6–C10 aryl groups.

7. The method of claim 1 in which the cell opener comprises a 2-acyl-1,3-diketone of the general formula

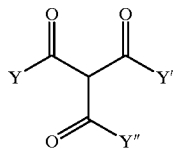

in which Y, Y', and Y" are independently C6–C10 aryl or CXX'X" wherein X, X', and X" are independently hydrogen, halogen, C1–C20 alkyl, C6–C10 aryl, substituted- C1–C20 alkyl, or substituted- C6–C10 aryl groups.

8. The method of claim 1 in which the cell opener comprises an ester of a substituted-acetic acid of either of the general formulae

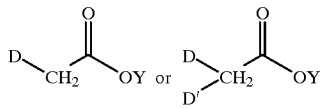

in which Y is C6–C10 aryl or CXX'X" wherein X, X', and X" are independently hydrogen, halogen, C1–C20 alkyl, C6–C10 aryl, substituted- C1–C20 alkyl, or substituted- C6–C10 aryl groups, and D and D' are electron-withdrawing substituents.

9. The method of claim 1 in which the cell opener is selected from the group consisting of 2,4-pentanedione, 2,4-hexanedione, dibenzoylmethane, 1-benzoylacetone, triacetylmethane, methyl cyanoacetate, ethyl cyanoacetate, butyl cyanoacetate, octyl cyanoacetate, diethyl-1,3-acetone dicarboxylate, pyrrolidine derivative of 2,4-pentanedione, piperidine derivative of 2,4-pentanedione, 1,3-cyclohexanedione, ethyl acetoacetate, 3-methyl-2,4-pentanedione, 3-ethyl-2,4-pentanedione, diethyl malonate, and ethyl nitroacetate.

10. The method of claim 1 in which the cell opener is selected from the group consisting of methyl cyanoacetate, ethyl cyanoacetate, butyl cyanoacetate, octyl cyanoacetate, 2,4-pentanedione and ethyl nitroacetate.

11. The method of claim 1 in which the blowing agent comprises water or water and HCFC.

12. The method of claim 2 in which the blowing agent comprises water or water and HCFC.

13. In a method for preparing a flexible polyurethane foam which comprises reacting an organic diisocyanate with a polyester or polyether polyol in the presence of urethane catalyst, water or water and HCFC as the blowing agent, optionally a silicone surfactant cell stabilizer, and a cell opener, the improvement for reducing shrinkage and/or the force-to-crush of the flexible foam which comprises as the cell opener an active methylene- or methine-group containing compound selected from the group consisting of β-dicarbonyl compounds, esters of cyanoacetic acid, esters of 1,3-acetone dicarboxylic acid, 2-acyl-1,3-diketones, 2-acyl-1,3-keto esters, and esters of substituted-acetic acids in which the substituents are electron-withdrawing groups, the cell opener present at 0.001-2.5 pphpp.

14. The method of claim 13 in which the cell opener is present at 0.005–1.5 pphpp.

15. In a flexible polyurethane foam having a density of 0.6–25 lb/ft$^3$ (10–400 kg/m$^3$) prepared by reacting a composition comprising the following components in parts by weight (pbw):

| | |
|---|---|
| Polyol | 20–100 |
| Polymer Polyol | 80–0 |
| Silicone Surfactant | 0.5–2.5 |
| Stabilizer/Cell Opener | 0.05–3 |
| Water | 1–8 |
| Auxiliary Blowing Agent | 0–4.5 |
| Crosslinker | 0.5–2 |
| Catalyst Composition | 0.1–5 |
| Isocyanate Index | 70–115 | the improvement for reducing shrinkage and/or the force-to-crush of the flexible foam which comprises as the stabilizer/cell opener an active methylene- or methine-group containing compound selected from the group consisting of -dicarbonyl compounds, esters of cyanoacetic acid, esters of 1,3-acetone dicarboxylic acid, 2-acyl-1,3-diketones, 2-acyl-1,3-keto esters, and esters of substituted-acetic acids in which the substituents are electron-withdrawing groups.

16. The flexible foam of claim 15 in which the stabilizer/cell opener is selected from the group consisting of 2,4-pentanedione, 2,4-hexanedione, dibenzoylmethane, 1-benzoylacetone, triacetylmethane, methyl cyanoacetate, ethyl cyanoacetate, butyl cyanoacetate, octyl cyanoacetate, diethyl-1,3-acetone dicarboxylate, pyrrolidine derivative of 2,4-pentane-dione, piperidine derivative of 2,4-pentanedione, 1,3-cyclohexanedione, ethyl acetoacetate, 3-methyl-2,4-pentanedione, 3-ethyl-2,4-pentanedione, diethyl malonate, and ethyl nitroacetate.

17. The flexible foam of claim 15 in which the cell opener is selected from the group consisting of methyl cyanoacetate, ethyl cyanoacetate, butyl cyanoacetate, octyl cyanoacetate, 2,4-pentanedione and ethyl nitroacetate.

* * * * *